UNITED STATES PATENT OFFICE.

HERMAN J. RUFLI, OF MOBILE, ALABAMA.

METHOD OF PRODUCING PAVEMENTS.

No. 839,424.   Specification of Letters Patent.   Patented Dec. 25, 1906.

Application filed September 20, 1906. Serial No. 335,483.

*To all whom it may concern:*

Be it known that I, HERMAN J. RUFLI, a citizen of the United States of America, residing at Mobile, in the county of Mobile and State of Alabama, have invented certain new and useful Improvements in Methods of Producing Pavements, of which the following is a specification.

This invention relates to paving, in particular to a composition and the method of producing and applying the said composition.

One of the novel ideas forming the basis of this invention consists in the use of the excavated material—whether it be simply swamp, black prairie, or bottom lands, loam, clay, gravel, waxy-gumbo soil, sand, or natural formation—as a basis of the ingredients of the composition, doing away with the use of costly preparations and hauling of material in the producing of a road-bed, thus enabling an operator to remove the soil or material forming the bed of ordinary roads and by simply drying and heating the said material to 300° Fahrenheit and adding to it certain ingredients, to be hereinafter specified, relaying the said material in the excavation, and forming thereby a foundation and surface of unusual stability and rigidity.

The further object of the invention is to produce a pavement which would be sanitary, in that the material now forming city and country roads would be removed and sterilized through the drying and heating process to such a degree as to destroy all disease germs which are usually present in the dust and dirt of such roads permeated by vegetable and organic matter.

As the great advantage of this invention resides in the use of the excavated material as a base for the pavement to be laid, it follows that the expense of producing this pavement is minimized, since no hauling of the basic material is required, and it is not necessary to purchase sand, gravel, or specially-prepared ingredients.

The process of making this pavement is, broadly, as follows: The soil is first excavated from the roadway or street where the pavement is to be laid. Then it is thoroughly mixed with pitch and other ingredients, to be hereinafter specified, and the resulting product is laid in the excavation and rolled, as is customary in making similar pavement. By the term "pitch" is meant, preferably, the pitch of coal-tar.

The process more in detail is as follows: The soil is first excavated from the roadway or street where the pavement is to be laid. In the second place, it is dried by raising the temperature to 150° Fahrenheit. The soil is combined with a disinfecting compound consisting of eight per cent. naphthalene, seven per cent. abietite, and five per cent. paracreosol, and the temperature is further raised to 300° Fahrenheit until completely sterilized. This heating may be done as a continued process of drying—that is, the earth is subjected to heat for drying same, and while it is thus heated the disinfectants may be combined with the soil in the desired proportions and thoroughly mixed therewith. While this would be the shortest way of doing the work, still if the soil had been dried and become cool it could subsequently be heated and the ingredients combined with it. The only object of this part of the process is to cause thorough mixing.

While I have referred to pitch or like material as a "binding agent," I prefer after the soil has been sterilized and disinfected to use a cement or binding agent which would comprise the following ingredients in approximately the proportion stated, viz: utilizing sixty per cent. of carbon-pitch, five per cent. anthracene-oil, fifteen per cent. of dead oil of coal-tar, ten per cent. maltha, and ten per cent pine-tar. The binding agent thus produced is utilized and compounded with the soil in the proportion of seventy-eight parts of soil to twenty-two parts of the cement or binding agent.

The amount of disinfectant used varies with the conditions, but may be from one to ten pounds to one hundred pounds of the earth and binder.

The road-bed is compressed by a roller to produce a compact foundation, the mass applied thereto being rolled to leave corrugations between each layer. The top layer will then be rolled until a smooth even surface is produced, whereby traction is obtained with the least effort.

It will be found that the disinfectants readily combine with the earth and binder without affecting the action of the binder. The binding ingredients are selected for the reason that they dry quickly and produce an effect similar to asphalt without being affected perceptibly by heat and cold after they are mixed with the earth.

Having fully described my invention, what

I claim as new, and desire to secure by Letters Patent, is—

1. The method of producing pavement consisting of excavating a road-bed, drying and heating the material thus excavated and applying thereto a disinfectant consisting of naphthalene and abietite and para-creosol and raising the temperature of the material to 300° Fahrenheit adding thereto a binding material consisting of carbon-pitch, anthracene-oil, dead oil of coal-tar, maltha and pine-tar and replacing the material thus produced in the excavation.

2. The method of producing pavement consisting of excavating a road-bed, drying and heating the material thus excavated and applying thereto a disinfectant consisting of eight per cent. naphthalene, seven per cent. abietite and five per cent. para-creosol and raising the temperature of the material to 300° Fahrenheit adding thereto a binding material consisting of carbon-pitch, anthracene-oil, dead oil of coal-tar, maltha and pine-tar and replacing the material thus produced in the excavation.

3. The method of producing pavement consisting of excavating a road-bed, drying and heating the material thus excavated and applying thereto a disinfectant consisting of naphthalene, abietite and para-creosol and raising the temperature of the material to 300° Fahrenheit adding thereto a binding material consisting of sixty per cent. carbon-pitch, five per cent. anthracene-oil, fifteen per cent. dead oil of coal-tar, ten per cent. maltha, and ten per cent. pine-tar, and replacing the material thus produced in the excavation.

4. The method of producing pavement consisting of excavating a road-bed, drying and heating the material thus excavated and applying thereto a disinfectant consisting of eight per cent. naphthalene, seven per cent. abietite and five per cent. para-creosol and raising the temperature of the material to 300° Fahrenheit. adding thereto a binding material consisting of sixty per cent. carbon-pitch, five per cent. anthracene-oil, fifteen per cent. dead oil of coal-tar, ten per cent. maltha, and ten per cent. pine-tar, and replacing the material thus produced in the excavation.

In testimony whereof I affix my signature, in the presence of two witnesses, this 17th day of September, 1906.

HERMAN J. RUFLI.

Witnesses:
ANDREW STRAUSS,
GEO. J. SULLIVAN.